United States Patent
Watanabe

(10) Patent No.: US 7,542,084 B2
(45) Date of Patent: Jun. 2, 2009

(54) IMAGING APPARATUS FOR READING IMAGES AT A SET RESOLUTION

(75) Inventor: Nobuyuki Watanabe, Yokohama (JP)

(73) Assignee: Olympus Optical Co., Ltd., Tokyo (JP)

(*) Notice: Subject to any disclaimer, the term of this patent is extended or adjusted under 35 U.S.C. 154(b) by 860 days.

(21) Appl. No.: 10/464,589

(22) Filed: Jun. 18, 2003

(65) Prior Publication Data

US 2003/0231247 A1 Dec. 18, 2003

(30) Foreign Application Priority Data

Jun. 18, 2002 (JP) ............... 2002-176911

(51) Int. Cl.
- H04N 9/07 (2006.01)
- H04N 3/14 (2006.01)
- H04N 5/335 (2006.01)

(52) U.S. Cl. .................. 348/266; 348/304; 348/308

(58) Field of Classification Search ............. 348/222.1, 348/266, 294, 302–305, 307–309, 311–312, 348/315–316; 250/208.1
See application file for complete search history.

(56) References Cited

U.S. PATENT DOCUMENTS

| | | | |
|---|---|---|---|
| 5,262,871 A * | 11/1993 | Wilder et al. | 348/307 |
| 5,493,335 A * | 2/1996 | Parulski et al. | 348/231.6 |
| 5,949,483 A * | 9/1999 | Fossum et al. | 348/303 |
| 6,124,888 A * | 9/2000 | Terada et al. | 348/302 |
| 6,794,627 B2 * | 9/2004 | Lyon et al. | 250/208.1 |
| 2001/0012051 A1 * | 8/2001 | Hara et al. | 348/14.01 |

FOREIGN PATENT DOCUMENTS

| | | |
|---|---|---|
| JP | 6217201 | 8/1994 |
| JP | 2001245141 | 9/2001 |

* cited by examiner

*Primary Examiner*—Sinh N Tran
*Assistant Examiner*—Daniel M Pasiewicz
(74) *Attorney, Agent, or Firm*—Volpe and Koenig, P.C.

(57) ABSTRACT

An imaging apparatus for outputting image signals by effecting photoelectric conversion of images formed at an optical system by an image sensor having a color filter array having various spectral transmittance disposed on a front surface thereof includes an image size setting means for setting one selected from a plurality of previously provided image reducing rates for determining an image size of image signals output from the image sensor; and a readout control means for controlling pixel locations at which image signals are read out from the image sensor, wherein the readout control means reads out image signals from the image sensor in accordance with a readout rule corresponding to the image reducing rate set by the image size setting means.

2 Claims, 15 Drawing Sheets

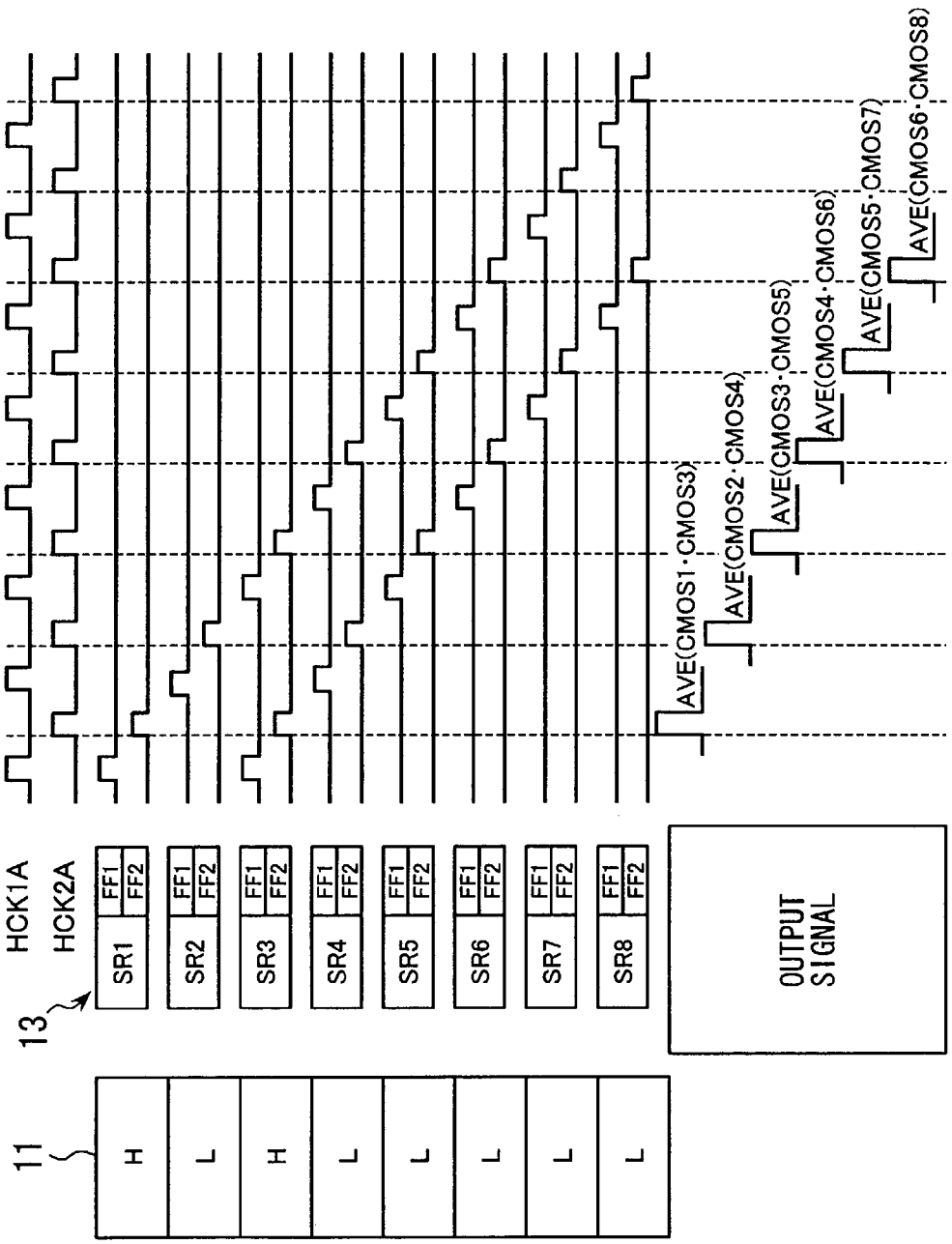

LINEAR FILTER

LINEAR FILTER

IMAGING APPARATUS FOR READING IMAGES AT A SET RESOLUTION

CROSS REFERENCE TO RELATED APPLICATION(S)

This application claims the benefit of Japanese Patent Application No. 2002-176911 filed in Japan on Jun. 18, 2002, the contents of which are incorporated by this reference as if fully set forth herein.

BACKGROUND

The present invention relates to imaging apparatus, and more particularly relates to an imaging apparatus capable of rapidly generating an optionally-sized, reduced image from a high-resolution image sensor.

Because of the spreading of personal computers in recent years, there is an increasing demand for digital cameras as an image pickup equipment. Also, high-quality digital camcorders are widely used as recording equipment of a movie.

Among the several factors that determine the image quality of the above described digital camera, the number of pixels of image sensor is a major factor for determining resolution. For this reason, some digital cameras are sold in the recent market as having even a large number of pixels of 4,000,000 or more.

For some use of photographed images, however, a high-definition image data having a large number of pixels is not necessarily required. For example, one having a reduced pixel size is more likely to be used as the image to be displayed at Web sites on the Internet. Further, as an added function for digital camera, a sequence of images of the same object can be taken with instantaneously varying the image taking condition so as to save only those of excellent results.

In this case, however, while pictures must be taken in rapid succession, not so many of those digital cameras having a large number of pixels are capable of taking images in rapid succession as bottlenecked by the flashing time from the image sensor to image memory. Further, since taking of a movie by a digital camera is also demanded, transmission to the memory in any case must be performed rapidly. It is preferable to previously reduce the amount of data to be processed.

On the other hand, when image size is to be reduced in conventional size reducing techniques based on linear interpolation, all pixels are used at first to form a large size image and then a smaller size image is formed by a linear interpolation. FIGS. 1 and 2 illustrate the techniques for generating a full-color reduced image by sampling of bilinear interpolation and bi-cubic interpolation, respectively, from Bayer-matrix image.

In the case based on the sampling of bilinear interpolation shown in FIG. 1, a full-color data of point A, B, C, D, is computed from a total of 12 points of R, G, B data in its vicinity. For example, linear combinations of R43, R45, R63, R65, B34, B36, B54, B56, G44, G53, G55, G64, are used for point A, and linear combinations of R03, R05, R23, R25, B14, B16, B34, B36, G15, G24, G26, G35 for point B. Similar linear combinations are used also for points C, D.

In the case based on the sampling of bi-cubic interpolation shown in FIG. 2, on the other hand, the linear combinations for point B for example use a total of 48 points: R61, R63, R65, R67, R01, R03, R05, R07, R21, R23, R25, R27, R41, R43, R45, R47, B72, B74, B76, B70, B12, B14, B16, B10, B32, B34, B36, B30, B52, B54, B56, B50, G75, G04, G06, G13, G15, G17, G22, G24, G26, G20, G33, G35, G37, G44, G46, and G55.

Although such techniques for generating a reduced image by linear interpolation provide an excellent image quality, there is a disadvantage of slow operation due to the fact that the linear interpolation is performed by fetching all pixel data. This is unfavorable as described above in the function for taking a multiple of images in rapid succession or when taking a movie.

Among the techniques for reducing the amount of read out data to be transmitted to the memory as described, methods are known to add an integrating function to the image sensor so that a reduced image is generated by reading a smaller number of averaged data. Japanese Patent Application Laid-Open Number 2001-245141 discloses an image reducing method using advantage of such methods. In the technique disclosed in the above mentioned Japanese Patent Application Laid-Open Number 2001-245141, the original image on a single-image sensor incorporating Bayer matrix color filter array is formed into a three-sensor condition by separating it into R, G, B planes. An integration of pixel signals of each color in the three-sensor condition is performed in horizontal and vertical directions to change the size in each directions.

Among the averaging readout methods, a method is known in an image sensor using CCD to perform a concurrent readout of current values of plurality of pixels to shorten the total readout time. Use of this method, however, involves the problem of the overflow of capacity of transmission area which results in deterioration of signals. Further, a method for solving such problem in readout by CCD is the averaging of voltage readouts by capacitor device of CMOS as disclosed in Japanese Patent Application Laid-Open Number Hei-6-217201. Furthermore, Japanese Patent Application Laid-Open Number Hei-9-247689 suggests a technique in which averaging/thinning out sampling readout and all-pixel readout are switched between a movie and still image, revealing an advantage of improvement in the reading speed.

SUMMARY

It is an object of the present invention to provide an imaging apparatus in which the speed of fetching an arbitrarily-sized, reduced image of a photographed image from a high-resolution image sensor can be improved.

In a first aspect of the imaging apparatus according to the invention, there is provided an imaging apparatus for outputting image signals by effecting photoelectric conversion of images formed at an optical system by an image sensor having a color filter array having various spectral transmittance disposed on a front surface thereof, including: an image size setting means for setting one selected from a plurality of previously provided image reducing rates for determining an image size of the image signals output from the image sensor; and a readout control means for controlling pixel locations at which image signals are read out from the image sensor. The readout control means reads image signals from the image sensor in accordance with a readout rule corresponding to the image reducing rate set by the image size setting means.

In a second aspect of the invention, the imaging apparatus according to the first aspect further includes a look up table for storing rules for reading from the image sensor correspondingly to the plurality of image reducing rates. The readout control means obtains a readout rule corresponding to the image reducing rate set by the image size setting means from the look up table and reads image signals from the image sensor in accordance with the obtained readout rule.

In a third aspect of the invention, the plurality of image reducing rates stored in the look up table in the imaging apparatus according to the second aspect are of restricted discrete values.

In a fourth aspect of the invention, the imaging apparatus according to the first aspect further includes a filtering section for redistributing image signals from the image sensor read out by the readout control means through a weighted filtering process corresponding to the image size set by the image size setting means to generate image signals having uniformly spaced pixel intervals.

In a fifth aspect of the invention, the readout rule in the imaging apparatus according to the first aspect is formed by combining a mode of reading all pixels, intermittent readout modes for reading by thinning out predetermined pixels, and averaging readout modes for reading by averaging a plurality of pixels as the mode of reading pixel signals from the image sensor.

In a sixth aspect of the invention, the readout control means in the imaging apparatus according to the first aspect sets sampling blocks to be used in reading image signals from the image sensor to have a size of lines and columns and a number of blocks corresponding to the image reducing rate set by the image size setting means and outputs reduced image signals by reading pixels from the image sensor on the basis of the sampling blocks.

In a seventh aspect of the invention, each sampling block set by the readout control means in the imaging apparatus according to the sixth aspect is one or the other of a basic block and an adjusting block different in its row and/or column size from the basic block, and the readout control means changes combination of the basic blocks and adjusting blocks corresponding to the image reducing rate set by the image size setting means.

BRIEF DESCRIPTION OF THE DRAWING(S)

FIG. 5 is a timing chart for explaining operation of the averaging readout processing circuit shown in FIG. 4.

FIG. 9 shows the manner of reducing 18×18 pixels to 5×5 full color pixels in an image sensor having a color filter of single-sensor Bayer matrix.

FIG. 10 shows the manner of reducing 22×22 pixels to 5×5 full color pixels in an image sensor having a color filter of single-sensor Bayer matrix.

DETAILED DESCRIPTION OF THE PREFERRED EMBODIMENT(S)

Figure 1:
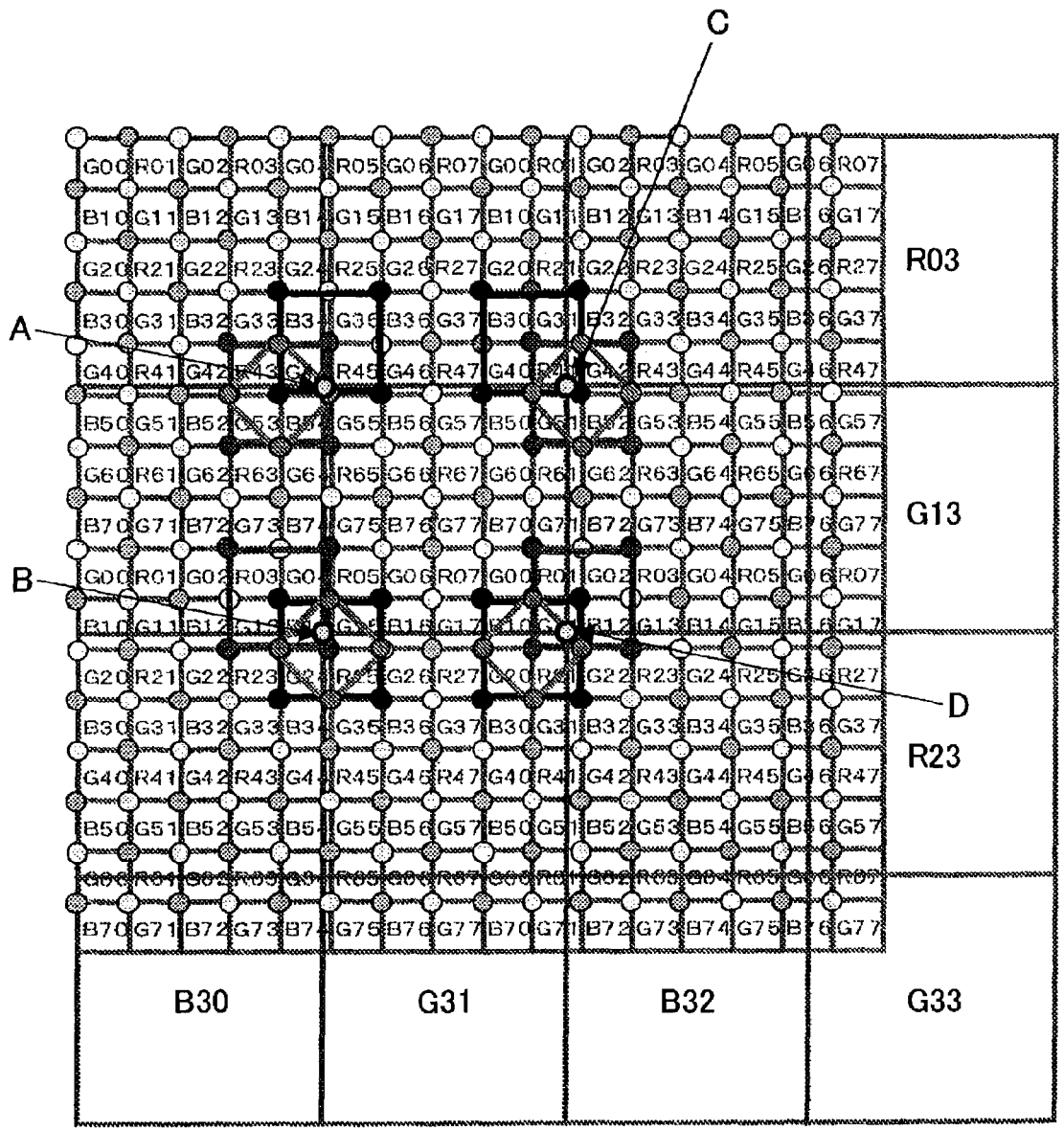
FIG. 1 illustrates the manner of generating a full-color reduced image by the sampling of bilinear interpolation from Bayer-matrix image.
Figure 2:
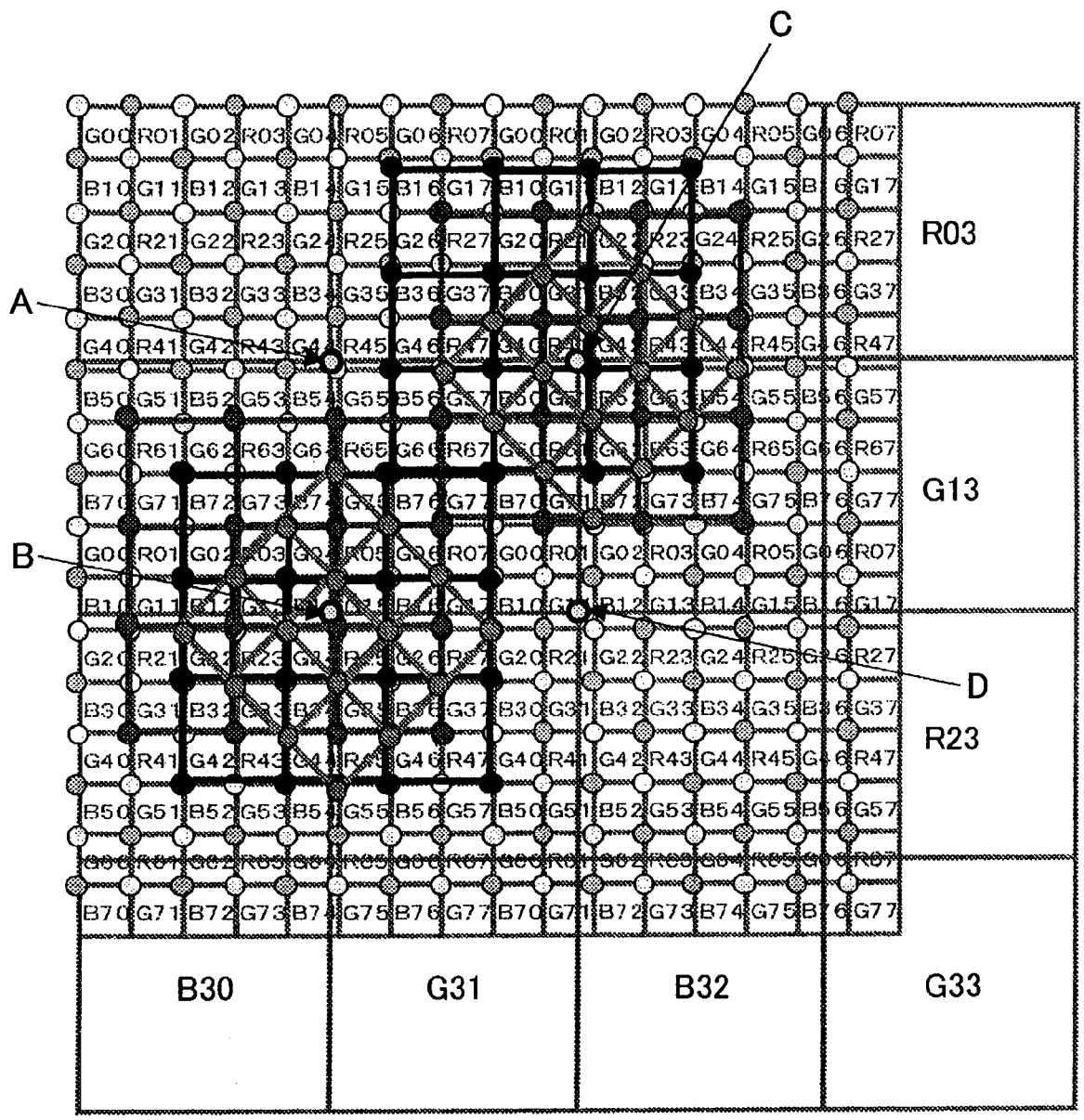
FIG. 2 illustrates the manner of generating a full-color reduced image by the sampling of bi-cubic interpolation from Bayer-matrix image.
Figure 3:
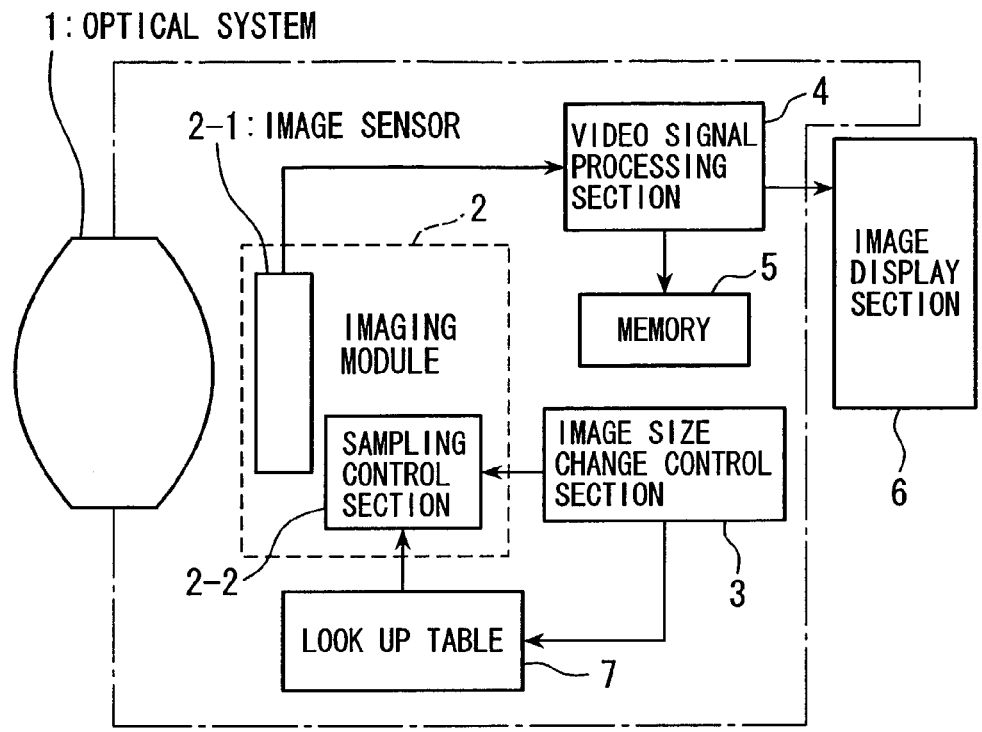
FIG. 3 is a block diagram showing a first embodiment of the imaging apparatus according to the invention.

Some embodiments of the invention will now be described. FIG. 3 is a block diagram schematically showing the construction as a whole of a first embodiment of the imaging apparatus according to the invention. In FIG. 3, numeral 1 denotes an optical system. The optical system 1 forms an image of objects on an image sensor 2-1 within an imaging module 2, such as CMOS sensor having a color filter array (CFA) in single-sensor Bayer matrix (not shown) on a front surface thereof. The operation of the image sensor 2-1 is controlled by a sampling control section 2-2. The output signals-of the image sensor 2-1 are processed by a video signal processing section 4 and, if video signals are to be recorded, the processed result is output to a memory 5. Further a real-time information is output to and displayed on an image display section 6 such as a view finder. At the sampling control section 2-2, switching of sampling control is made under control of an image size change control section 3 correspondingly to the case of rendering a record on the memory 5 or the case of causing a display on the image display section 6.

The image size change control section 3 is configured to be capable of selecting/setting an all-pixel readout mode and a pixel size changing readout mode. At the pixel size change control section 3, a plurality of reducing rates of the image size of video signals to be output from the image sensor 2-1 are previously provided so that a predetermined image reducing rate can be selectively set. The readout rules for the image size changing readout are stored in a lookup table 7 as combinations of intermittent readout and averaging readout to be described later corresponding to the plurality of image reducing rates provided at the image size change control section 3. When a reducing rate is selectively set at the image size change control section 3, a readout rule corresponding to the selectively set reducing rate is supplied to the sampling control section 2-2 from the look up table 7. The sampling control section 2-2 controls reading of the image sensor 2-1 based on the supplied readout rule so that video signals of a predetermined reducing rate are output from the image sensor 2-1.

Figure 4:
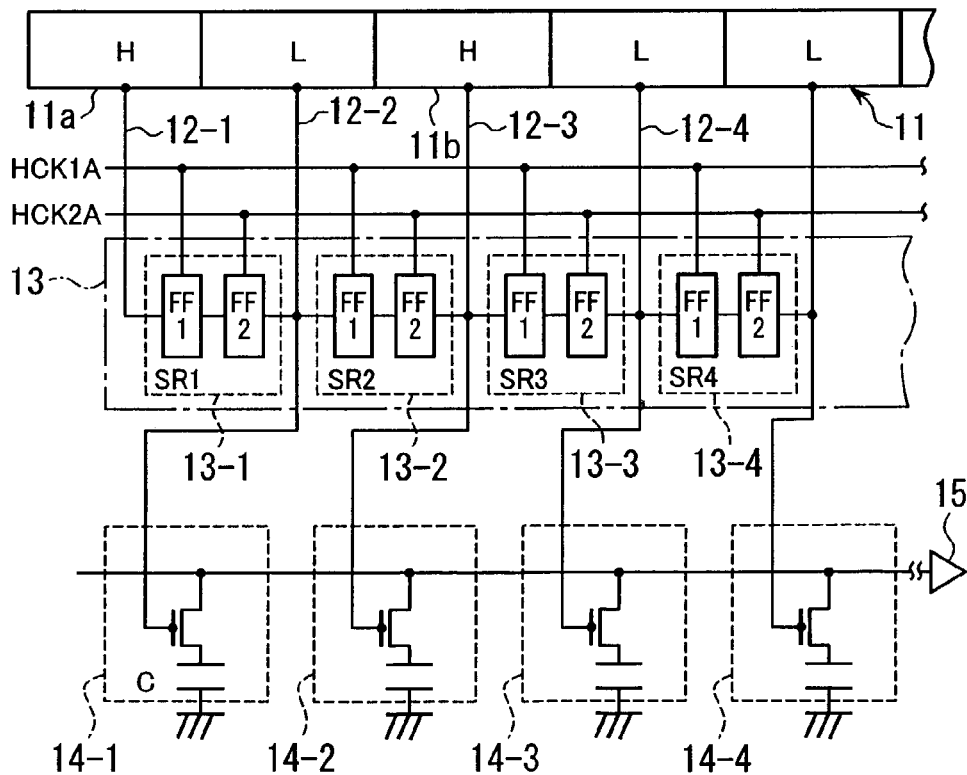
FIG. 4 shows a circuitry for performing averaging readout processing in the imaging module of the first embodiment shown in FIG. 3.

A description will now be given by way of FIG. 4 with respect to the construction of the image sensor 2-1 such as CMOS sensor having a processing circuit for achieving averaging readout in the imaging module 2 in the above described first embodiment. For ease of explanation, a construction for describing the operation at one horizontal line in the image sensor 2-1 is shown. STB signals 12-1, 12-2, . . . , from a start pulse location register 11 provided in the sampling control section 2-2 for designating the readout start locations are delivered as input signals to a shift register 13 for driving CMOS sensor. In the illustrated example, the operation of the shift register 13 is rendered as 2-phase flip-flop (FF) operation. The first-phase FF1 is driven by clock signal HCK1A and the second-phase FF2 is driven by clock signal HCK2A. By such 2-phase flip-flop operation, transmission to the cascaded shift register units (SR1) 13-1, (SR2) 13-2, . . . , is performed. When the output of each shift register unit is driven to "H", the gate of each CMOS sensor elements 14-1, 14-2, . . . , of CMOS sensor is opened to read an optical signal by activating line for reading voltage corresponding to the photoelectric charge accumulated at each capacitor C.

Here, if the two locations 11a, 11b are concurrently brought to the condition of "H" in the start pulse location register 11 for designating the readout start locations so as to concurrently activate the first-phase FF1 of the shift register unit 13-1, 13-3 at the corresponding two locations, the outputs of the second-phase FF2 of the shift register units 13-1, 13-3 are concurrently brought to "H" to open the respective gates of CMOS sensor elements 14-1, 14-3. The output signal obtained by averaging voltages of capacitors C at the designated two locations is thereby read out. In particular, the voltages of capacitors C of CMOS sensor elements 14-1 and 14-3 are averaged and read out. Thereafter, the operation of the shift register 13 causes the two readout locations to be successively shifted to the right so as to concurrently open for example the respective gates of CMOS sensor elements 14-2, 14-4.

FIG. 5 shows the contents of the start pulse location register 11 for designating the start locations for effecting such averaging readout operation. It also shows, in time series, the operation of the 2-phase shift register 13 and the output signals of CMOS sensor. As described above, average value AVE(CMOS1.CMOS3) of the CMOS sensor element 14-1 and CMOS sensor element 14-3, average value AVE (CMOS2.CMOS4) of the CMOS sensor element 14-2 and CMOS sensor element 14-4, average value AVE (CMOS3.CMOS5) of the CMOS sensor element 14-3 and CMOS sensor element 14-5, . . . and so on, are sequentially output in that order to the output terminal 15 of CMOS sensor.

In this manner, capacitor voltages of CMOS sensor elements at two or more locations can be read out as an average by once operation pulse for driving the shift register 13. Here, supposing that the arrangement of the color filters in one line of CMOS sensor is for example R-G-R-G . . . , the above averaging readout operation causes the reading of averaged optical signals in a manner sequentially shifting to the right for example of an average of two R signals that are separated by one other pixel in the horizontal direction, then an average of G signals, etc.

Figure 6A:
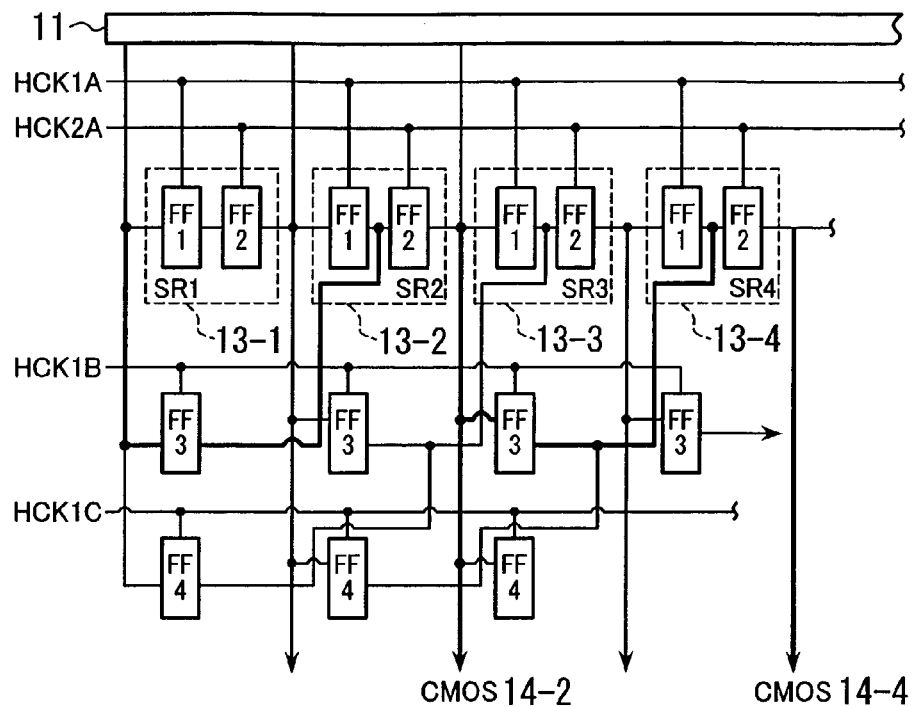
FIGS. 6A, 6B show a circuitry for performing an intermittent readout processing in the imaging module shown in FIG. 3 and a timing chart for explaining the operation thereof.

A description will now be given with respect to pixel readout of thinned out (skip readout) which is another read method to be used in CMOS sensor in the present embodiment. FIG. 6A is a block diagram showing the construction of a shift register for achieving the operation for reading every other pixel. In the shift register for the readout operation of every other pixel, a third flip-flop FF3 driven by clock signal HCK1B is disposed in parallel to the first phase FF1 of each shift register unit 13-1, 13-2, etc. The third FF3 is connected at the input terminal thereof to the input of the first phase FF1, and at the output terminal thereof to the input of the second phase FF2 of the next-stage shift register unit. It should be noted that, in the shift register shown in FIG. 6A, a fourth FF4 is also shown, since it is used also as the shift register for 2-pixels intermittent readout to be described next.

Figure 6B:
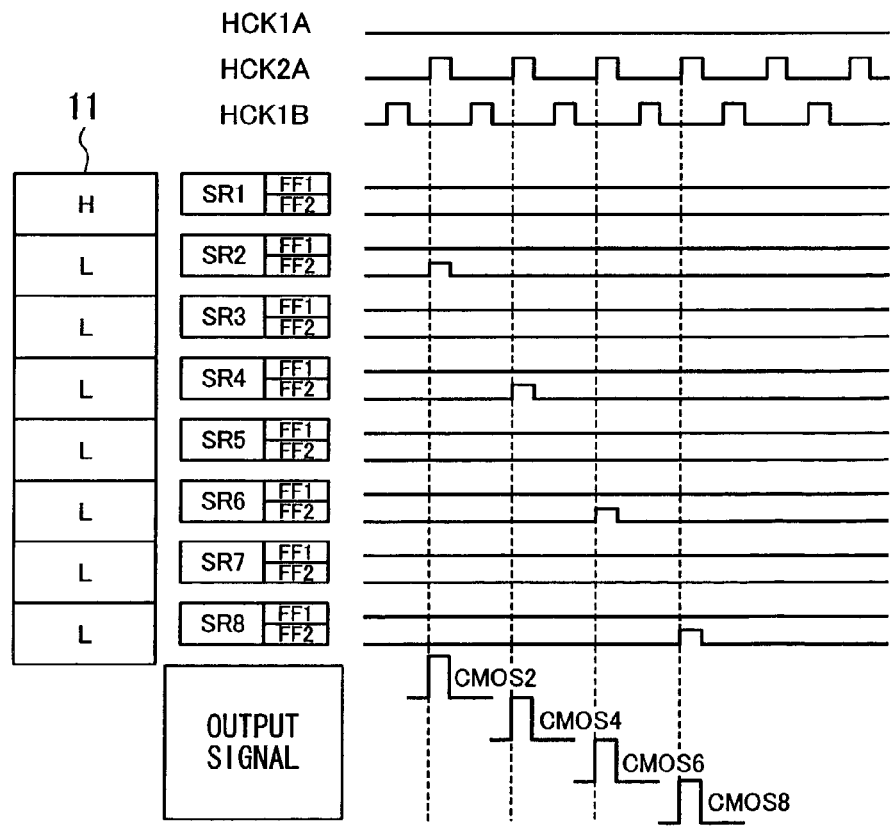

To thus constructed shift register, as shown in FIG. 6B, pulses as shown are input from the start pulse location register 11, and it is driven by the clock signals of HCK1A, HCK2A and HCK1B. Gate control signals corresponding to CMOS sensor element 14-2, CMOS sensor element 14-4, etc., are thereby output from the shift register to perform readout operation of every other pixel. Accordingly, the pixel signals CMOS2, CMOS4, etc., are obtained from the output terminal 15 in the order of CMOS sensor element 14-2, CMOS sensor element 14-4, etc.

Figure 7:
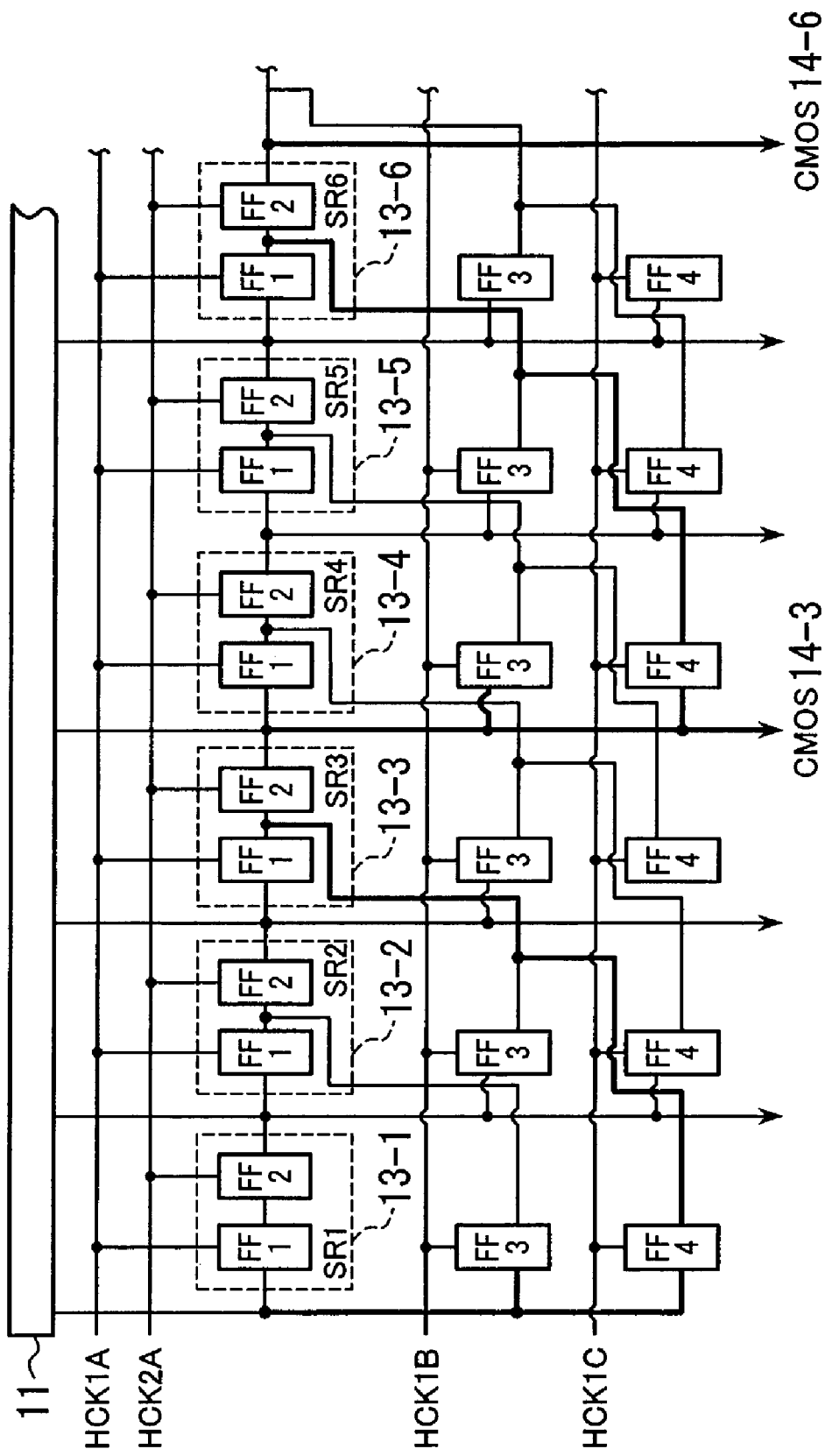
FIG. 7 shows another circuitry for performing intermittent readout processing.

FIG. 7 is a block diagram showing the construction of a shift register for causing an intermittent readout operation for skipping two pixels. Of the shift register for such 2-pixels intermittent readout operation, in parallel to the first phase FF1 of each shift register unit 13-1, 13-2, . . . , a third FF3 to be driven by clock signal HCK1B is disposed and at the same time a fourth FF4 to be driven by clock signal HCK1C is disposed. The fourth FF is connected at the input terminal thereof to the input of the first phase FF1, and at the output terminal thereof to the second phase FF2 of the shift register unit 13-3 (SR3) at one stage after the next.

Figure 8:
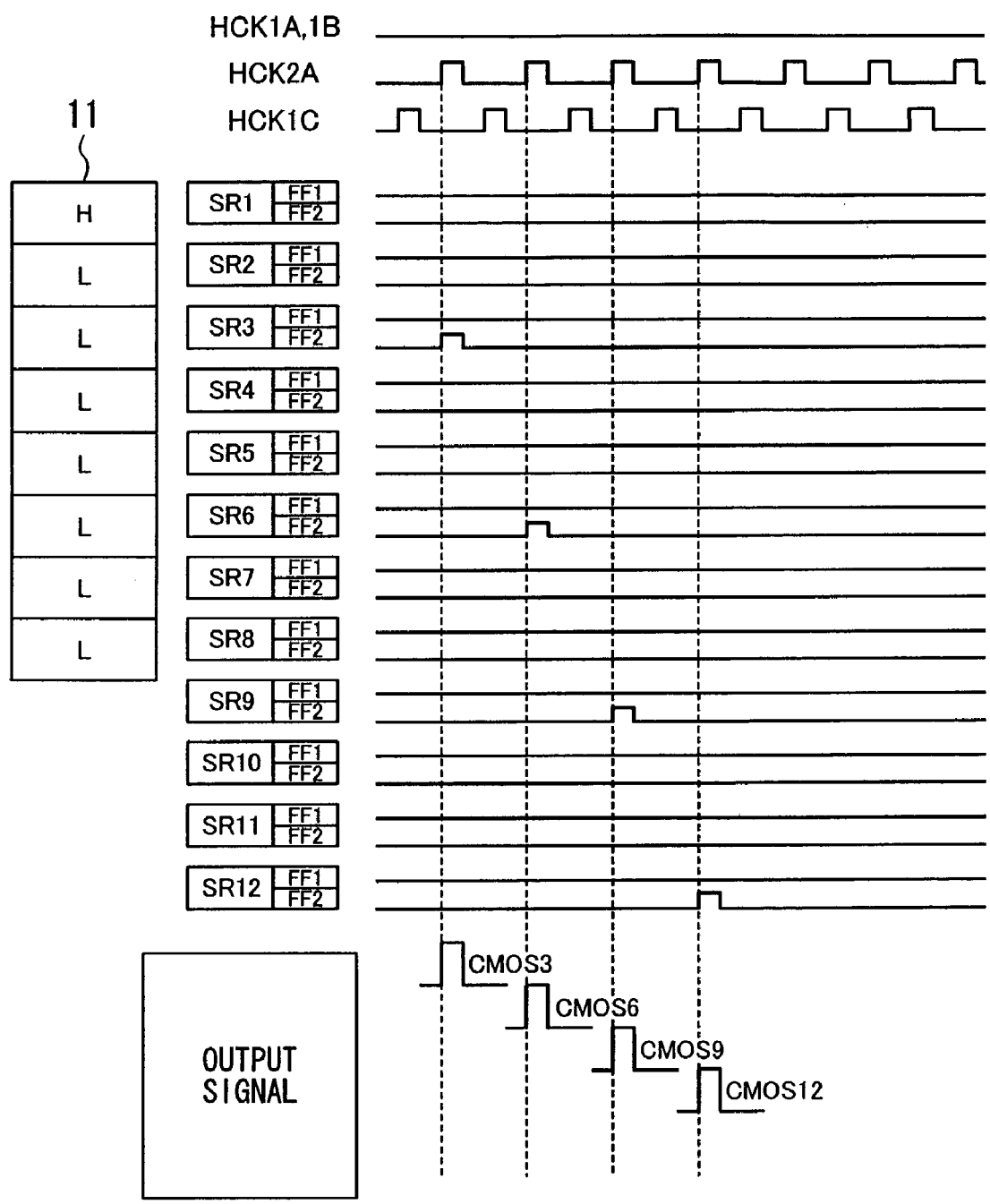
FIG. 8 is a timing chart for explaining operation of the intermittent readout processing circuit shown in FIG. 7.

To thus constructed shift register, as shown in FIG. 8, pulses as shown are input from the start pulse location register 11, and it is driven by the clock signals of HCK1A, HCK2A, HCK1B and HCK1C. Gate control signals corresponding to CMOS sensor element 14-3, CMOS sensor element 14-6, etc., are thereby output from the shift register to perform the intermittent readout operation for skipping two pixels. Accordingly, the pixel signals CMOS3, CMOS6, etc., are obtained from the output terminal 15 in the order of CMOS sensor element 14-3, CMOS sensor element 14-6, etc.

Figure 9:
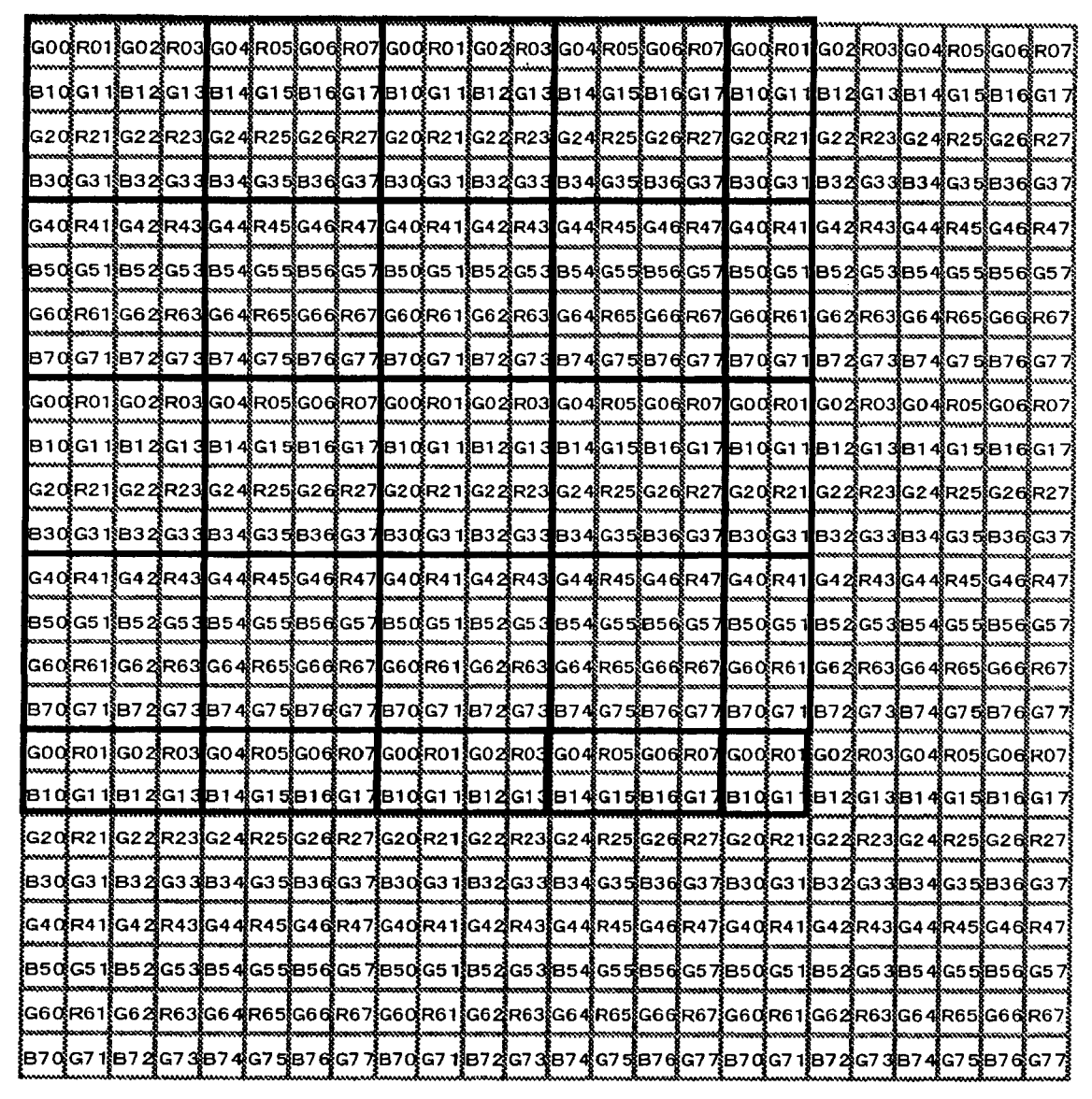

A technique will now be described of using the above described averaging readout and intermittent readout (skip readout) to actually read images in a reduced manner from the image sensor. In the present embodiment, it is a premise to use an image sensor having a single-plate, Bayer-matrix color filter. Accordingly, a full-color data corresponding to a location (coordinates) of the same object is obtained by means of an estimate for example by interpolating or averaging R, G, B data that are respectively at different locations on the image sensor. FIG. 9 partially shows the manner of a case where $(4+4+4+4+2)\times(4+4+4+4+2)=18\times18$ pixels in Bayer matrix are reduced to 5×5 full color pixels by using sixteen 4×4 (4 rows, 4 columns) sampling blocks, four 4×2 sampling blocks, four 2×4 sampling blocks, and one 2×2 sampling block. Such a reducing transform is effected over the entire image.

Accordingly, the reducing rate in this case is $5/18$ or about 27%. In such reducing transform processing, 18 pixels in the horizontal direction can be sampled by 2×4+2=10 clocks supposing that each 4-pixel block is sampled by 2 clocks based on 2-pixels averaging readout of every other pixel having a same color channel (R, G, or B) and the block having two pixels in the horizontal direction is read out by 2 clocks. It is thus seen that a higher speed in reading optical signals from the image sensor can be achieved by such reducing readout.

Figure 10:
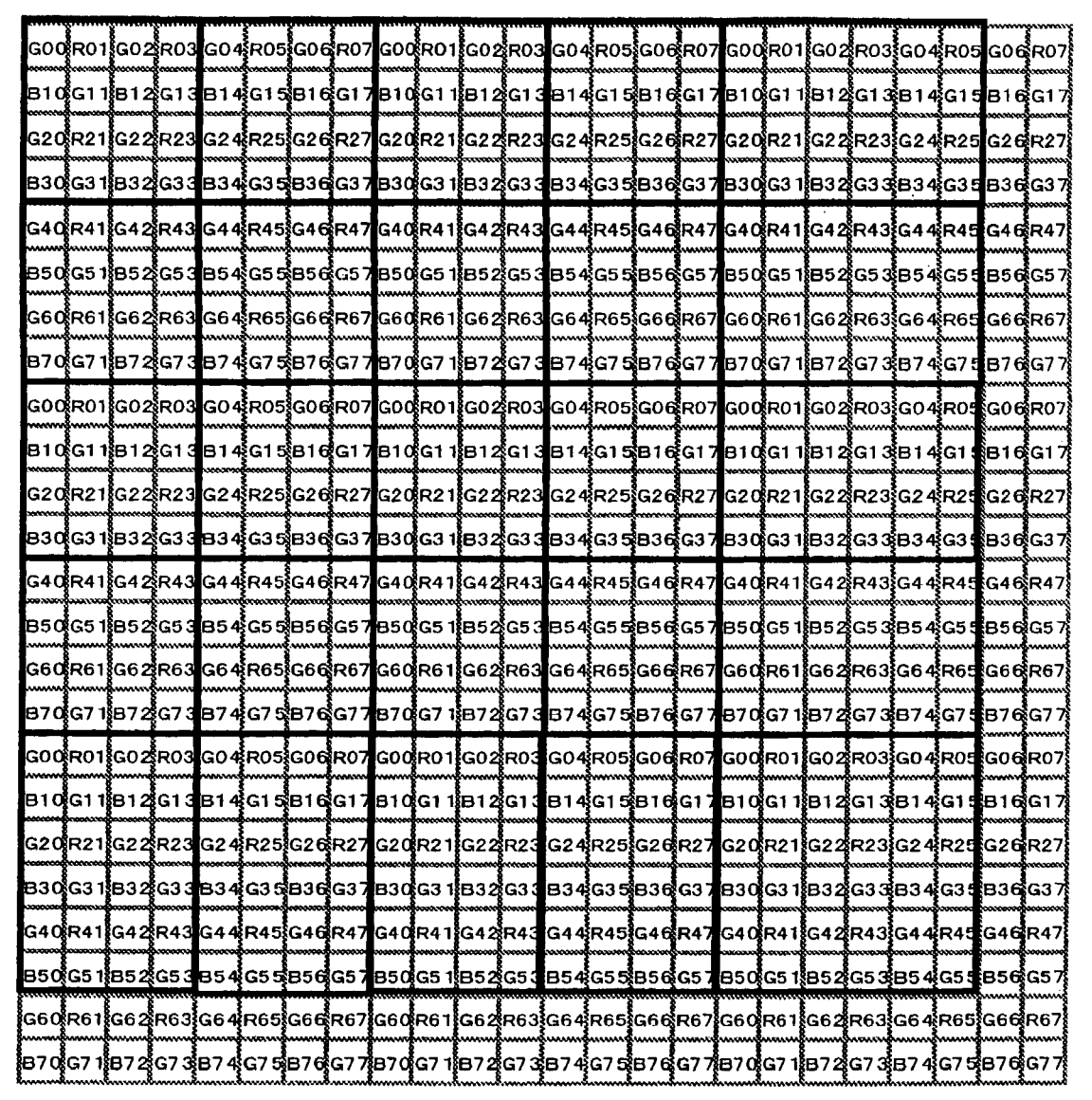

Further, as shown in FIG. 10, a reducing processing of $5/22$ or about 22.72% can be performed by forming 22×22 pixels of Bayer matrix into 5×5 full color pixels based on sixteen 4×4 blocks, four 6×4 blocks, four 4×6 blocks, and one 6×6 block. In this case, the number of clocks in the horizontal reading is 2 clocks for the 4-pixels blocks and 2 clocks for the 6-pixels block where three pixels are concurrently readout at a clock so that readout is achieved by a total of 2×4+2=10 clocks. The principle and advantage in increasing the speed of reducing readout in this case is similar to that shown in FIG. 9.

A description will now be given with respect to the relation between the reducing rates to be set at the image size change control section 3 and the corresponding readout rules. As will be shown below, for a given reducing rate "a", a number of sampling blocks "x" is obtained such that there are x−1 units of basic block having a certain length, and one adjusting block.

(1) Adjustment by: (x−1) units of 2-pixels block+one 4-pixels block if 50>a>33.3 (%)

$a/100=x/\{2(x-1)+4\} \rightarrow x=a/(50-a)$ (2) Adjustment by: (x−1) units of 4-pixels block+one 2-pixels block else if 33.3>a>25 (%)

$a/100=x/\{4(x-1)+2\} \rightarrow x=a/(2a-50)$ (3) Adjustment by: (x−1) units of 4-pixels block+one 6-pixels block else if 25>a>20 (%)

$a/100=x/\{4(x-1)+6\} \rightarrow x=a/(50-2a)$ (4) Adjustment by: (x−1) units of 6-pixels block+one 4-pixels block else if 20>a>16.6 (%)

$a/100=x/\{6(x-1)+4\} \rightarrow x=a/(3a-50)$

In this manner, the combination of blocks (for example of 4-pixels basic block and 2-pixels adjusting block) is changed according to the reducing rates. For example, the case of (1) represents the relation between the number of sampling blocks "x" and reducing rate "a" when x−1 units of 2-pixels basic blocks and one 4-pixels adjusting block are used. In the case of (1), for example, a reducing rate of 33% or less cannot be achieved whatever the combination is if the number of 2-pixels blocks is greater (x≧2). Accordingly, it indicates that a reduction of image can be achieved by readouts of 2-pixels blocks and 4-pixels block only if the reducing rate is within a limit of 33% to 50%. Similarly, in the case of (2), a reducing rate of 25% or less cannot be achieved by a combination of 4-pixels block and 2-pixels block. Based on similar concepts, classification according to the cases of (1) to (4) is effected to assign ways of combining the pixel numbers in blocks to the respective reducing rates in computing the sampling rules (readout rules).

Figure 11:
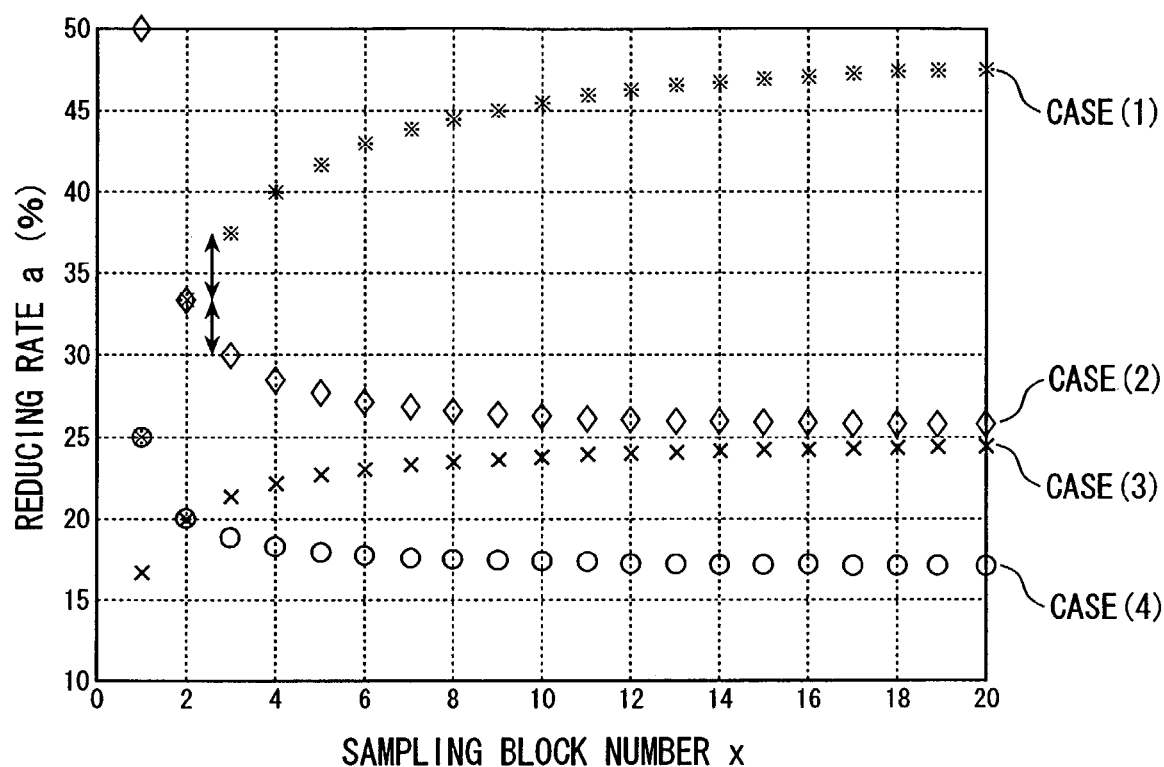
FIG. 11 is a graph indicating the relation between the image reducing rates (by per cent) and the number of sampling blocks.

Although real-time computation of such transform is possible, the present embodiment has the relation between reducing rate "a" to be set at the image size change control section 3 and sampling block number "x" (x−1 units of basic block having a certain length and one adjusting block) stored to a look up table (LUT) 7. A diagrammatic representation of such relation between the image reducing rates "a" and sampling block numbers "x" is shown in FIG. 11. As can be seen from the figure, the reducing transform rules shown in the above described cases (1) to (4) are capable of only obtaining the reducing rates at discrete values. Especially, intervals of the order of 3% occur in the discreteness of the values around 33%. As one can see, in FIG. 11, there is no sampling rule (readout rule) corresponding to the reducing rate of 35% or 32.5% as in the range indicated by arrows. Supposing that the reducing rates at discrete values are permissible in actual use, the LUT is constructed by considering the maximum width of the discreteness so that scaling for the reducing rates by about 3% is used up to 25% and scaling by 1.6% is used up to 20%.

The divisional reading by blocks, which constitute such readout rules, can be achieved by adjusting for example the readout locations in the combination of averaging readout and intermittent readout (skip readout) using the shift register as described by way of FIGS. 4 to 8.

Figure 12:
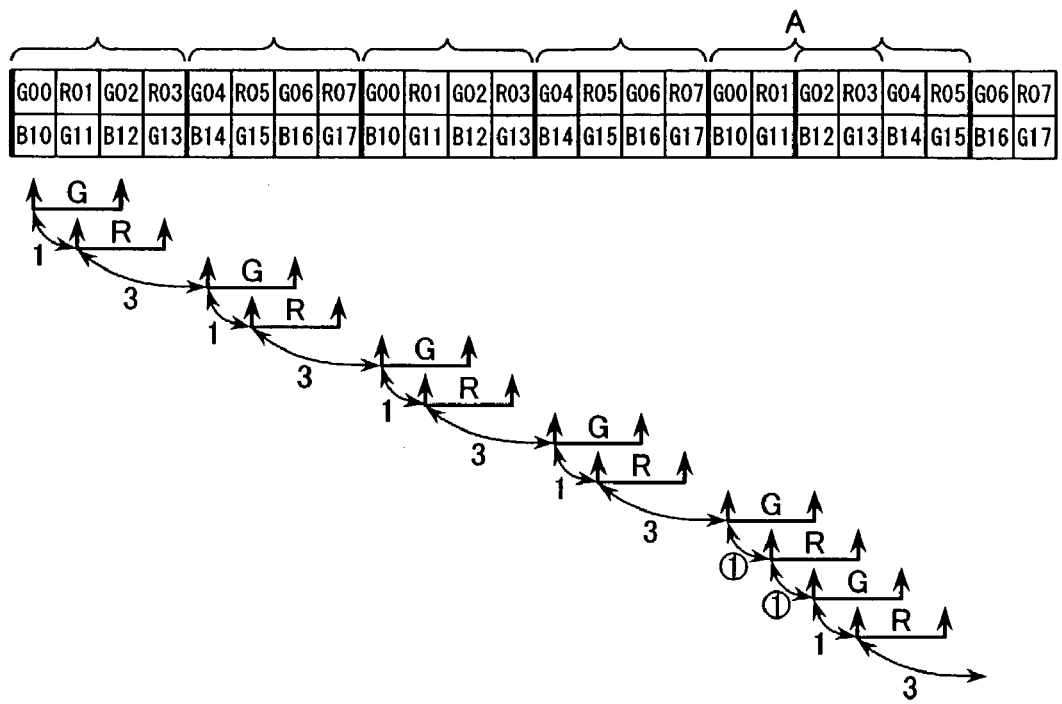
FIG. 12 illustrates the manner of sampling (without readout shift) by a readout rule at the time of setting the reducing rate to 5/18 in the horizontal direction.
Figure 13:
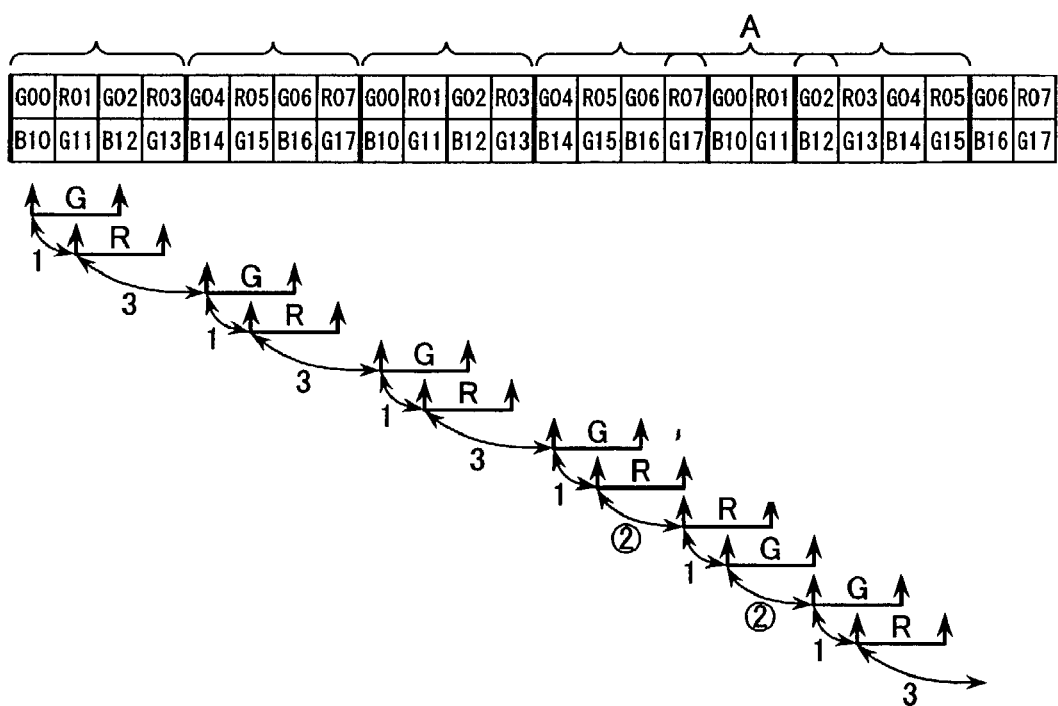
FIG. 13 illustrates the manner of sampling (with readout shift) by a readout rule at the time of setting the reducing rate to 5/18 in the horizontal direction.

The actual readout rules will now be described with reference to FIGS. 12 and 13. FIGS. 12 and 13 each show the manner of sampling according to a readout rule where the reducing rate is 5/18 and four 4-pixels basic blocks and one adjusting 2-pixels block are used for the ease of understanding, operation for one line is shown in diagram. FIG. 12 shows the manner of not effecting readout shift in the readout of the adjusting 2-pixels block; and FIG. 13 shows the manner of effecting readout shift in the readout of the adjusting 2-pixels block. For ease of explanation, the reading in the horizontal direction is shown.

Here each pair of pixels to be concurrently read out is indicated by arrows and the shift amount of readout location is indicated by numerals. The illustrated example indicates the manner at a reducing rate of 5/18 where 4+4+4+4+2=18 pixels are transformed into 5 pixels.

In the illustrated examples of FIGS. 12 and 13, the block at the left end is sampled by a pair of G00+G02 and pair of R01+R03 (averaging readout), and in the case of 4-pixels blocks, the readout location is shifted by one pixel within block and shifted by three pixel between blocks (skipping number of 1, 3, 1, 3). To control such skipping, it suffices to set predetermined operation pulses of the FF1, FF2 of the shift register and of the externally provided FF3, FF4 shown in FIGS. 7 and 8. In particular, it suffices to store to the look up table 7 in FIG. 3 the averaging readout methods and shift amounts correspondingly as the above to the reducing rates of image.

In the method of reading of the 2-pixels block portion in the manner shown in FIG. 12, as indicated by parenthesis A, one each of the color pixels (G, R) of the next 4-pixels block are used to effect readout corresponding to four pixels by two times of 2-pixels averaging with a shifting of one pixel. The reading of the 2-pixels block portion in the manner shown in FIG. 13 is performed by the method where, as indicated by parenthesis A, adding pixels of one each of the 4-pixels blocks before and after the 2-pixels block are used to effect readout corresponding to four pixels by two times of averaging readout. For this reason, at the blocks before and after the 2-pixels block, the shifting in the readout rule becomes the skipping numbers of 1 and 2 as shown in FIG. 13. Since the number of clocks in the averaging readout at the 2-pixels block portion is identical to the readout clocks of a single pixel, information of the original image can be effectively used to generate a reduced image.

In the reading technique shown in FIG. 12, the phase of readout of G, R is not changed at the 2-pixels block portion. By contrast, in the pixel reading technique shown in FIG. 13, the phase of readout of G, R is inverted at the 2-pixels block portion. In particular, while reading is performed in the order of G to R in 4-pixels blocks, it becomes the order of R to G in the 2-pixels block.

In this case, synchronization of timing (phase inversion of R→G) is required in allocating the readout pixels to the planes of the respective colors. In this manner, according to the invention, the reading speed in obtaining a size-reduced image can be improved by relating control of averaging readout and skip readout of CMOS to the reducing rate of image. Accordingly, the relation between the resolution of image and the reading speed can be suitably set in taking a movie or taking images in rapid succession. Specifically, in order to improve the reading speed, its relation with the resolution can be made flexible.

In the manner of reading by the readout rules in the above first embodiment, the readout intervals are not constant due to the occurrence of adjusting blocks. Accordingly, if such readout rules of reducing sampling are applied to the pixel array of the image sensor, distortion of image or jaggies (unnatural irregularities) on edges becomes conspicuous depending on the reducing rate. For example, if the reducing rate is 41.6% in the graph of FIG. 11, a readout rule by four 2-pixels basic blocks and one 4-pixels adjusting block (5/12) is used. On the other hand, if the reducing rate is about 27.3%, the readout rule becomes of one 2-pixels adjusting block for five 4-pixels basic blocks (6/22). While both are a combination of 2-pixels block and 4-pixels block, large stepping gaps are caused in the reduced image due to the fact that the ratio of 2-pixels sampling to 4-pixels sampling is twice. In the case of a reducing rate of 20%, by contrast, 6-pixels adjusting block for the 4-pixels basic blocks or 4-pixels adjusting block for 6-pixels basic blocks alternately occurs. Thus jaggies are not conspicuous in the reduced image at such reducing rate.

To control the distortion as of the former case, a limit is applied to the reducing rates to be set at the image size change control section so that the reducing rates of the above cases (1) and (2) that result in the readout rules combining 2 pixels and 4 pixels can be avoided in the look up table 7 which is provided to assign a readout rule corresponding to the reducing rate selected/set at the image size change control section 3. In particular, of the reducing rates set at the pixel size change control section, only those reducing rates of which the readout rules are a combination of 4 pixels and 6 pixels are adopted so as to assign the readout rules corresponding to such reducing rates. It is thereby possible to provide reduced images without conspicuous distortion.

For example, in the case of a reducing rate of 33.3%, a combination having alternating 2-pixels sampling block and 4-pixels sampling block becomes the readout rule [2/(4+2)]. As the number of blocks (two in the case of the reducing rate of 33.3%) in the combination of blocks is smaller in this way, jaggies in the reduction sampling of straight line have more regularity and distortion is made less conspicuous. Further, in the case of a reducing rate of 30%, the combination of two 4-pixels basic blocks and one 2-pixels adjusting block becomes the readout rule [3/(4+4+2)]. Since the block number in the combination of blocks in this case is a small number of three, jaggies in the reduction sampling of a straight line become less conspicuous. In a reducing process, distortion thus becomes less conspicuous as the block number in the combination of blocks is smaller, since the cycle of jaggies in the reduction sampling of a straight line is shorter.

By contrast, if the number of blocks in the combination of blocks is large, for example in the case of a reducing rate of 41.6%, a combination of four 2-pixels basic blocks and one 4-pixels adjusting block becomes the readout rule [5/(2+2+2+2+4)] so that four, too many, 2-pixels sampling blocks occur between two 4-pixels sampling blocks. The cycle of jaggies at the time of reduction sampling of a straight line thereby becomes longer, resulting in a conspicuous distortion to the viewer. Accordingly, jaggies become less conspicuous by selecting those reducing rates where the number of blocks in the combination of sampling blocks is smaller (for example 33%, 30%, 28.5%, etc.).

Figure 14:
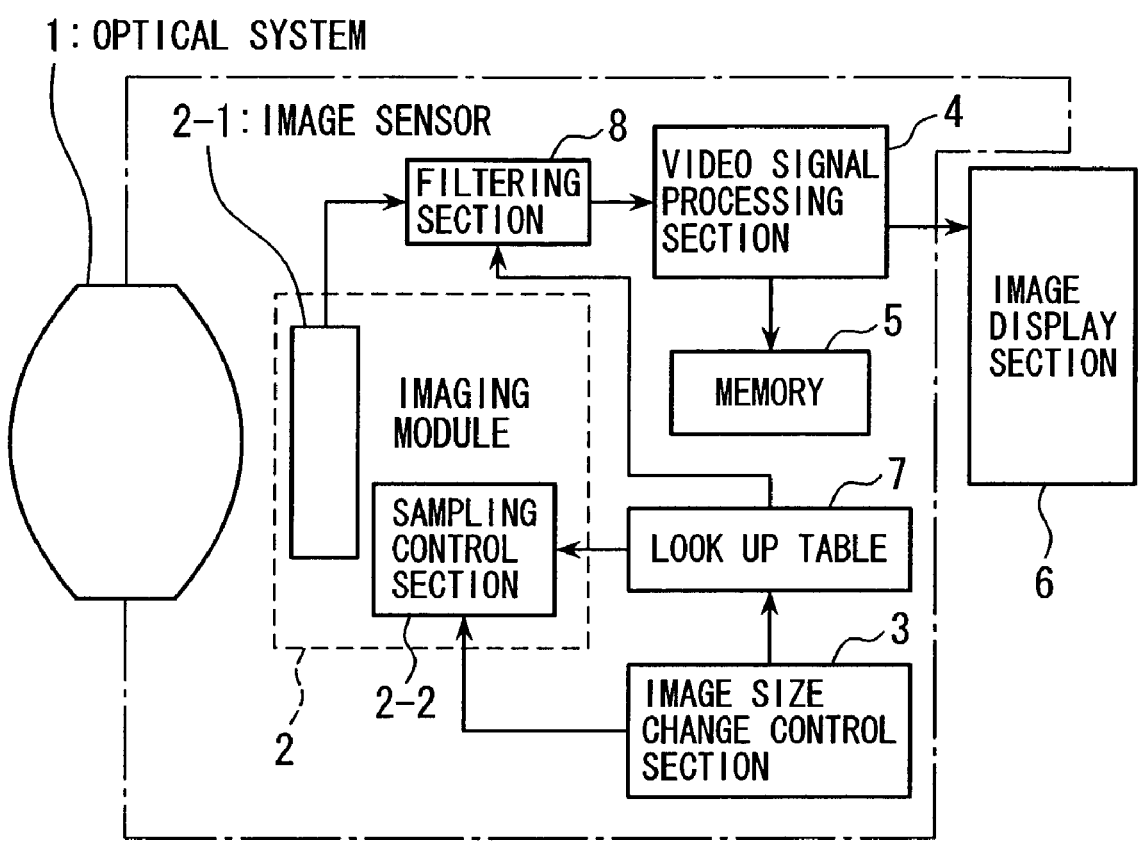
FIG. 14 is a block diagram showing a second embodiment of the invention.

A second embodiment of the invention will now be described by way of the block diagram shown in FIG. 14. This embodiment shows another technique for controlling the distortion in reduced image due to sampling as pointed out in the above first embodiment. In particular, as shown in FIG. 14, after the sampling readout of the image sensor 2-1 by the readout rules at the sampling control section 2-2, the distortion is reduced by a weighted filtering process (interpolation processing) through a filtering section 8. The computing processing of the weighted filtering of the filtering section 8 is designated corresponding to the contents of the reducing rate selected and set by the image size change control section 3.

The operation of the filtering section 8 will now be described. At the filtering section 8, computation of addition by weighted filter is performed to allocate the pixel signals once output in the sampling from the image sensor 2-1 to pixel having uniform discrete pitch. The technique of the weighted addition filtering will be described by way of an example shown in FIG. 15A. It is supposed that one cycle is consisting of the steps in which 4+4+4+4+2=18 pixels or four 4-pixels basic blocks and one 2-pixels adjusting block in the pixel array are reduced to read 5 pixels. Of the center locations of the respective blocks (locations i to n indicated by 2, 6, 10, 14, 18, 20 in FIG. 15A), the center locations 2(*i*) and 20(*n*) of the first block of the block arrangement of one cycle are regarded as reference locations where locations of the readout pixels and locations A to F of the uniformly spaced pixels coincide (A=i, F=n). Thereafter, the center locations of the second to fifth blocks (locations j to m indicated by 6, 10, 14, 18) are subjected to the weighted addition in the horizontal direction of the readout pixels so that they are equidistantly arranged between the reference locations (A=i, F=n).

Figure 15A:
FIGS. 15A, 15B illustrate an example of the weighted filtering addition processing at the filtering section and a linear filter therefore in the second embodiment shown in FIG. 14.
Figure 15B:
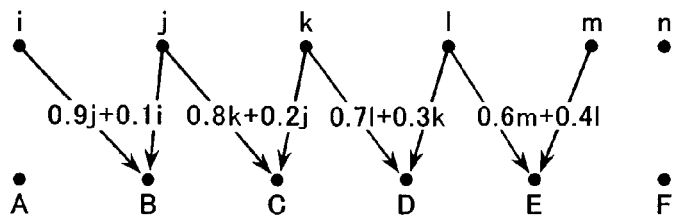

In this case, when the portion between the block locations 2(*i*) and 20(*n*) are uniformly distributed to five parts, each distance between the respective points A to F of the uniformly spaced arrangement is 18/5. Accordingly, the values of the locations (B, C, D, E) in the uniformly spaced arrangement after A=2 are set to 5.6, 9.2, 12.8, 16.4, respectively. These locations A to F in the uniformly spaced arrangement are represented by weighted addition filtering by using the sampling locations respectively adjacent to each location. For example, the uniformly spaced location B=5.6 is expressed as B=0.1×i+0.9×j by the weighted addition filtering using i=2, j=6. In the same way, the uniformly spaced locations C, D, E are expressed by j, k, l, m. The values expressed by such weighted addition filtering are as shown in FIG. 15A. Such redistributing linear transform by five pixels is expressed by a matrix format as shown in FIG. 15B.

Figure 16A:
FIGS. 16A, 16B illustrate another example of the weighted filtering addition processing at the filtering section and a linear filter therefore.
Figure 16B:
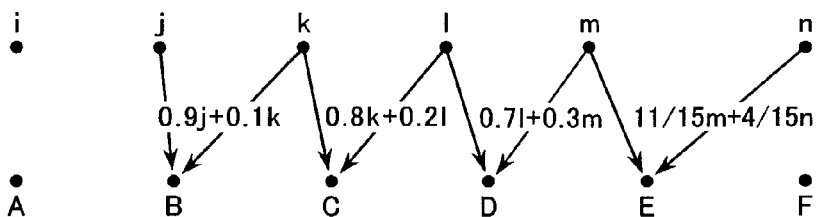
Figure 17A:
FIGS. 17A, 17B illustrate still another example of the weighted filtering addition processing at the filtering section and a linear filter therefore.
Figure 17B:
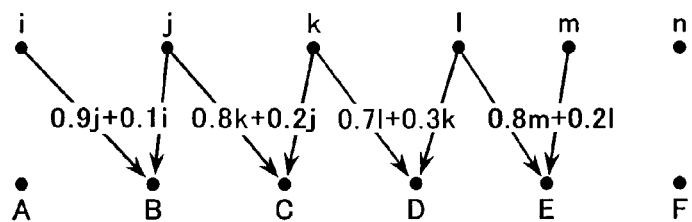
Figure 18A:
FIGS. 18A, 18B illustrate yet another example of the weighted filtering addition processing at the filtering section and a linear filter therefore.
Figure 18B:
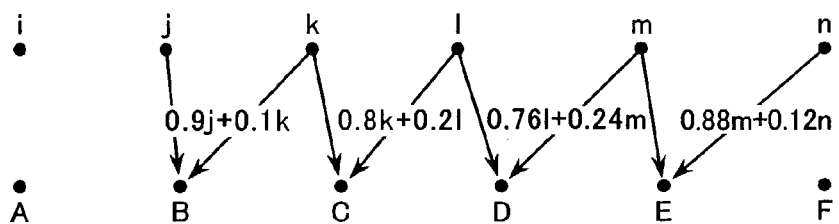

FIGS. 16A, 16B show an example of weighted addition filtering and linear filtering format thereof in the case where 4+4+4+4+6=22 pixels in four 4-pixels basic blocks and one 6-pixels adjusting block are reduced to effect sampling by five pixels. Further, FIGS. 17A, 17B and FIGS. 18A, 18B show the cases where the sampling of the last adjusting block (2-pixels or 6-pixels) of FIGS. 15A, 15B and FIGS. 16A, 16B are performed as shifted as shown in FIG. 13, respectively. While, for ease of understanding, only the examples in the horizontal direction are shown in these figures, a redistribution to an uniformly spaced arrangement is effected also with respect to the vertical direction similarly by weighted addition filtering.

Figure 19A:
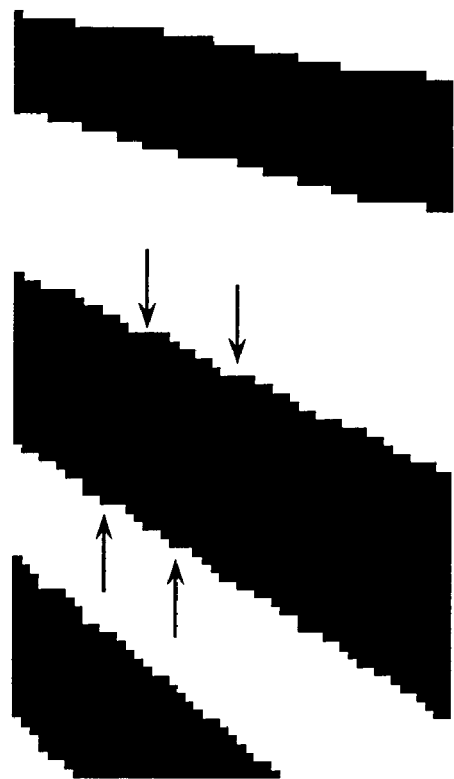
FIGS. 19A, 19B illustrate an image condition after processing by the filtering section
Figure 19B:
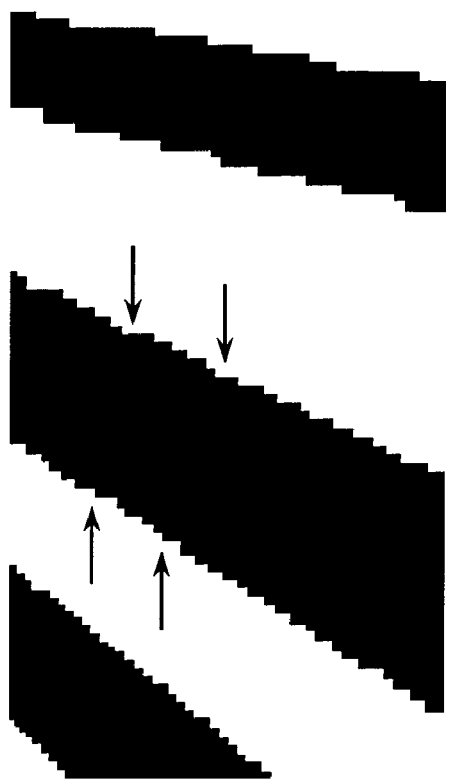

Accordingly, the rearrangement processing into an uniformly spaced arrangement can be effected at the filtering section 8 in FIG. 14 by storing as parameters related to each other: the reducing rates to be set by the image size change control section; the corresponding readout rules (averaging and shifting of readout locations) such as shown in FIGS. 12, 13; and the weighting factors of pixels as shown in FIGS. 15A to 18B. It should be noted that the weighting factors of such filtering process can be stored as look up table 7 similarly to the sampling rules in connection with the changes in image size. Based on such processing, jaggies on edges as indicated by arrows in FIG. 19A for example can be suppressed by the filtering effect as indicated by arrows in FIG. 19B.

As has been described by way of the above embodiments, with the first and fifth to seventh aspects of the imaging apparatus according to the invention, readouts of the image sensor are controlled by the readout rules corresponding to the image reducing rates set at the image size setting means. Thereby data corresponding to a set image reducing rate can be directly read out from the image sensor so as to improve the reading/fetching speed in reading a reduced image.

According to the second aspect of the invention, readout rules corresponding to image reducing rates set by the image size setting means are obtained from a look up table. Thus the image sensor can be read out through the readout control means by a readout rule corresponding to a set image reducing rate to output image signals of a predetermined reducing rate.

According to the third aspect of the invention, an image at a suitable reducing rate can be output, since the image reducing rates are stored as restricted discrete values.

According to the fourth aspect of the invention, image signals read out by a predetermined readout rule are redistributed through a weighted filtering process at the filtering section to generate image signals having uniform pixel intervals. It is thereby possible to reduce distortion of image and/or jaggies on edges which occur due to the inconstancy of readout pixel intervals.

What is claimed is:

1. An imaging apparatus for outputting image signals by effecting photoelectric conversion of images formed at an optical system by an image sensor having a color filter array having various spectral transmittance disposed on a front surface thereof, said imaging apparatus comprising:

an image size setting means for setting one selected from a plurality of previously provided image reducing rates (a) for determining an image size of the image signals output from said image sensor;

a readout control means for controlling pixel locations at which image signals of a total number (x) of sampling blocks are read out from said image sensor on the basis of sampling blocks set to have a size of lines and columns and a number of blocks corresponding to the image reducing rates (a) set by said image size setting means; and a filtering section for redistributing image signals from said image sensor read out by said readout control means into a uniform interval arrangement;

wherein said image size setting means has a look-up table for storing rules for reading from said image sensor correspondingly to said plurality of image reducing rates, and sets one selected from the image reducing rates stored in said look-up table;

wherein each sampling block set by said readout control means is one or the other of a basic block consisting of (m) pixels and an adjusting block consisting of (n) pixels different in pixel number from the basic block;

wherein said readout control means changes based on the following equation combination of said basic blocks and adjusting blocks corresponding to the image reducing rate set by said image size setting means:

$a/100 = x/\{m(x-1)+n\}$; and wherein said filtering section makes spatial intervals of read out pixels into uniform intervals by effecting on said image signals a weighted filtering process corresponding to the image size set by said image size setting means.

2. The imaging apparatus according to claim 1, wherein said readout rule is formed by combining a mode of reading all pixels, intermittent readout modes for reading by thinning out predetermined pixels, and averaging readout modes for reading by averaging a plurality of pixels as the mode of reading pixel signals from said image sensor.

* * * * *